T. W. Owens,
Line Fastener.
No. 105,483.  Patented July 19, 1870.
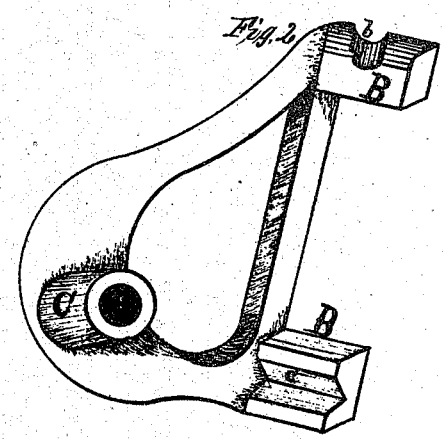
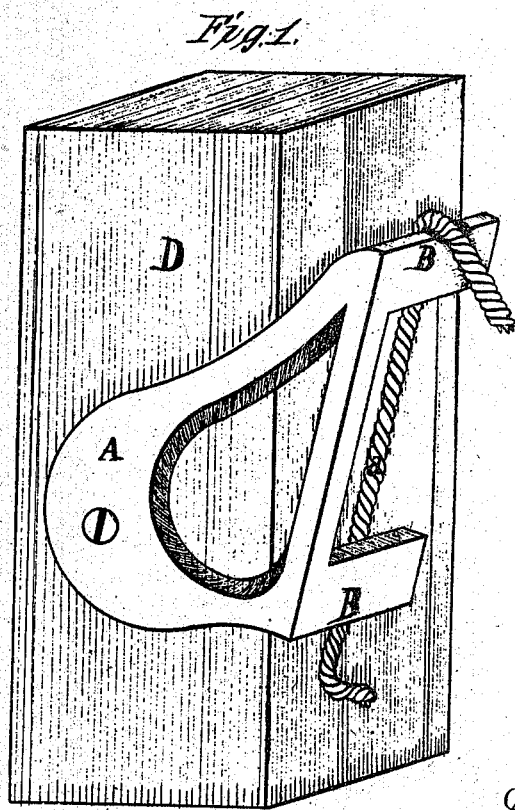

United States Patent Office.

THOMAS W. OWENS, OF GRANVILLE, OHIO.

Letters Patent No. 105,483, dated July 19, 1870.

IMPROVED CLOTHES-LINE CLAMP.

The Schedule referred to in these Letters Patent and making part of the same.

I, THOMAS W. OWENS, of Granville, in the county of Licking and State of Ohio, have invented a certain Improvement in Fastening the Ends of Clothes-Lines, of which the following is a specification.

Nature and Objects of the Invention.

The nature of my invention relates to the use of a closed metal bracket, A, fig. 1, having at each of its angles, studs B B, fig. 1, standing at right angles with its back face, attached in such a manner to a post that said bracket can vibrate easily, one of the studs forming a bearer for the line, the other a jaw, closing against the post, griping and rigidly securing the line.

Description of the Accompanying Drawings.

Figure 1 is a perspective view of my invention in use.

Figure 2 is a back view of the bracket, showing its construction.

General Description.

A is a metal bracket, of suitable size, with a bar connecting its arms, having at each of its angles studs B B, fig. 2, standing at right angles with its back face, the stud of the longer arm having a circular groove, $b$, fig. 2, to receive the line, and the stud of the other arm has a V-shaped groove, $c$, fig. 2, on its inside face, forming jaws to grip the line against the post.

On the circular part of the bracket is a round stud or hub, C, fig. 2. This stud is set in the post, and has a hole through it for a screw or bolt to secure it in its place. This forms its pivot, and gives it strength to resist the strain.

To use this invention, provide a square post, as described, or other suitable place where you wish to fasten the end or ends of your line. Bore a hole to receive the hub of the bracket, and bolt or screw it in its place, to move easily, being careful to place the longest arm upward, and the studs far enough from the post, over which they extend, to receive the line $d$, fig. 1. Place the line in its seat on the upper stud, bring it down between the lower stud and the post, make it taut as you wish it, and then turn down the bracket against the post, and the stud will grip and retain it securely.

To disengage your line, you simply turn upward the bracket, and your line is at liberty.

Claim.

What I claim as my improvement, and desire to secure by Letters Patent, is—

The bracket A, provided with the studs B, having circular groove $b$ and V-shaped groove $c$, and stud or hub C, constructed as herein described, for the purpose specified.

THOS. W. OWENS.

Witnesses:
JOHN A. SINNET,
E. MANTANYA.